US009946752B2

United States Patent
Lydick et al.

(10) Patent No.: US 9,946,752 B2
(45) Date of Patent: Apr. 17, 2018

(54) LOW-LATENCY QUERY PROCESSOR

(71) Applicant: Microsoft Technology Licensing, LLC, Redmond, WA (US)

(72) Inventors: Neil E. Lydick, Seattle, WA (US); Vijaykumar K. Aski, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 340 days.

(21) Appl. No.: 14/696,493

(22) Filed: Apr. 27, 2015

(65) Prior Publication Data

US 2016/0314173 A1 Oct. 27, 2016

(51) Int. Cl.
*G06F 17/30* (2006.01)

(52) U.S. Cl.
CPC .. *G06F 17/30483* (2013.01); *G06F 17/30522* (2013.01); *G06F 17/30566* (2013.01)

(58) Field of Classification Search
CPC ......... G06F 17/30483; G06F 17/30566; G06F 17/30522; G06F 12/0897; G06F 3/0685; G06F 15/17362; G06F 17/30589; G06F 17/15; G06F 17/30259; G06F 17/30604; G06F 19/16; G06F 19/707; G06F 19/24
USPC .................. 707/722, 713, 716, 718, 999.002
See application file for complete search history.

(56) References Cited

U.S. PATENT DOCUMENTS

| | | | |
|---|---|---|---|
| 5,930,786 A | 7/1999 | Carino et al. | |
| 5,970,490 A * | 10/1999 | Morgenstern | G06F 17/30569 |
| 6,199,059 B1 * | 3/2001 | Dahan | G06F 17/30392 |
| 6,263,345 B1 * | 7/2001 | Farrar | G06F 17/30454 |
| | | | 700/110 |
| 6,839,716 B1 * | 1/2005 | Della-Libera | G06F 17/30569 |
| 7,428,554 B1 * | 9/2008 | Coberley | G06F 19/28 |
| 7,475,058 B2 | 1/2009 | Kakivaya et al. | |
| 7,853,573 B2 | 12/2010 | Warner et al. | |
| 7,984,043 B1 | 7/2011 | Waas | |
| 8,442,940 B1 * | 5/2013 | Faletti | G06F 17/2785 |
| | | | 704/9 |
| 8,538,954 B2 | 9/2013 | George et al. | |
| 8,849,749 B2 | 9/2014 | Rishel et al. | |

(Continued)

OTHER PUBLICATIONS

"Distributed SQL: DDL and DML", Published on: Aug. 26, 2014 Available at: http://developers.memsql.com/docs/latest/concepts/distributed_sql.html.

(Continued)

*Primary Examiner* — Mohammed R Uddin

(74) *Attorney, Agent, or Firm* — Law Offices of Richard Chi; Richard Chi

(57) ABSTRACT

Techniques for implementing a low-latency query processor accommodating an arbitrary number of data rows with no column indexing. In an aspect, data is stored across a plurality of component databases, with no requirement to strictly allocate data to partitions based on row keys. A histogram table is provided to map object relationships identified in a user query to the component databases where relevant data is stored. A server processing the user query communicates with component databases via an intermediary module. The intermediary module may include intermediary nodes dynamically assigned to connect to the component databases to retrieve and process the queried data.

12 Claims, 12 Drawing Sheets

(56) References Cited

U.S. PATENT DOCUMENTS

| | | | | |
|---|---|---|---|---|
| 9,245,050 | B2* | 1/2016 | Schiffmann | G06F 17/30961 |
| 9,626,408 | B2* | 4/2017 | Demir | G06F 17/30448 |
| 2002/0038308 | A1 | 3/2002 | Cappi | |
| 2003/0182274 | A1* | 9/2003 | Oh | G06F 17/30873 |
| 2004/0015489 | A1* | 1/2004 | Anonsen | G06F 17/3041 |
| 2004/0117359 | A1* | 6/2004 | Snodgrass | G06F 17/30551 |
| 2005/0203869 | A1* | 9/2005 | Minamino | G06F 17/30607 |
| 2006/0161521 | A1* | 7/2006 | Dettinger | G06F 17/3043 |
| 2006/0248045 | A1* | 11/2006 | Toledano | G06F 17/30463 |
| 2007/0219959 | A1* | 9/2007 | Kanemasa | G06F 17/30932 |
| 2007/0260476 | A1* | 11/2007 | Smolen | G06F 17/30348 705/1.1 |
| 2008/0281801 | A1* | 11/2008 | Larson | G06F 17/30595 |
| 2008/0306903 | A1* | 12/2008 | Larson | G06F 17/30536 |
| 2009/0150367 | A1 | 6/2009 | Melnik et al. | |
| 2010/0251266 | A1* | 9/2010 | Majewski | G06F 3/0486 719/323 |
| 2012/0016901 | A1 | 1/2012 | Agarwal et al. | |
| 2012/0110515 | A1* | 5/2012 | Abramoff | G06F 17/30994 715/854 |
| 2013/0073581 | A1 | 3/2013 | Sandholm | |
| 2013/0138679 | A1* | 5/2013 | Kim | G06F 17/30979 707/765 |
| 2013/0290880 | A1 | 10/2013 | Wu et al. | |
| 2013/0339385 | A1 | 12/2013 | Abrams et al. | |
| 2014/0156632 | A1 | 6/2014 | Yu et al. | |
| 2014/0280037 | A1* | 9/2014 | Petride | G06F 17/30442 707/719 |
| 2014/0280298 | A1 | 9/2014 | Petride et al. | |

OTHER PUBLICATIONS

Shute, et al., "F1: A Distributed SQL Database That Scales", In Proceedings of the VLDB Endowment, vol. 6, Issue 11, Aug. 26, 2013, 12 pages.

"Database Sharding", Published on: Sep. 9, 2008 Available at: http://codefutures.com/database-sharding/.

Jenks, Alma., "Multi-Shard Querying", Retrieved on: Feb. 10, 2015 Available at: http://azure.microsoft.com/en-us/documentation/articles/sql-database-elastic-scale-multishard-querying/.

P S, Ganesh., "Database Sharding", Published on: Nov. 20, 2014 Available at: http://developeriq.in/articles/2014/nov/20/database-sharding/.

"Second Written Opinion Issued in PCT Application No. PCT/US2016/029268", dated Mar. 30, 2017, 7 Pages.

"International Search Report and Written Opinion Issued in PCT Application No. PCT/US2016/029268", dated Aug. 25, 2016, 11 Pages.

* cited by examiner

| 1210 | 1220 | 1230 | 1240 | 1250 | 1260 |
|---|---|---|---|---|---|
| Seq # | n-value | Per-DB Rowcount | Cum Rowcount | Per-DB Uncertainties [DB #1, DB#2, DB#3] | Total Uncertainty |
| 1 | n=9 | k2=5 | 5 | [4, 5, 5] | 14 |
| 2 | n=10 | k1=5 | 10 | [4, 4, 5] | 13 |
| 3 | n=19 | k2=10 | 15 | [4, 4, 5] | 13 |
| 4 | n=20 | k1=10 | 20 | [0, 4, 5] | 9 |
| 5 | n=25 | k3=5 | 25 | [0, 4, 4] | 8 |
| 6 | n=30 | k3=10 | 30 | [0, 4, 4] | 8 |
| 7 | n=35 | k2=15 | 35 | [0, 4, 4] | 8 |
| 8 | n=40 | k3=15 | 40 | [0, 4, 4] | 8 |
| 9 | n=45 | k2=20 | 45 | [0, 0, 4] | 4 |
| 10 | n=50 | k3=20 | 50 | [0, 0, 0] | 0 |

LOW-LATENCY QUERY PROCESSOR

BACKGROUND

State-of-the-art database systems are required to store and process massive amounts of data with extremely high efficiency. For example, a database storage solution for Internet business advertising accounts may require sorting, filtering, and paginating hundreds of millions of data records in sub-second time.

Current techniques for implementing very large databases include using federation schemes, wherein multiple databases are linked to a common central interface. In a federated database system, data is horizontally partitioned across multiple component databases, and federation keys are assigned to map data queries to corresponding component databases. While federation schemes are scalable to achieve greater capacity, they lack the flexibility and speed to dynamically adjust database access based on current network load. Furthermore, the assignment of related data rows to a single federation atomic unit may limit the amount of data that can be accommodated.

Accordingly, it would be desirable to provide a novel low-latency query processor capable of processing queries for arbitrary amounts of data, featuring dynamic adjustment and optimization depending on network load.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for implementing a low-latency query processor wherein data is stored across a plurality of component databases. A relationship histogram table is provided to map object relationships identified in a user query to the relevant component databases where data is stored. A central server processing the user query may communicate with the component databases via an intermediary module. The intermediary module may include intermediary nodes dynamically assigned to connect to the component databases according to a dynamically configured query plan. To improve performance, intermediary nodes may further sort, filter, and paginate data results returned from a lower layer prior to passing to a higher layer.

Other advantages may become apparent from the following detailed description and drawings.

DETAILED DESCRIPTION

Various aspects of the technology described herein are generally directed towards techniques for designing low-latency query processors. It will be appreciated that certain features of the techniques described below may be used for any types of database systems, including business intelligence (BI) analytics databases, accounting databases, customer relationship databases, other relational database management systems, etc. The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
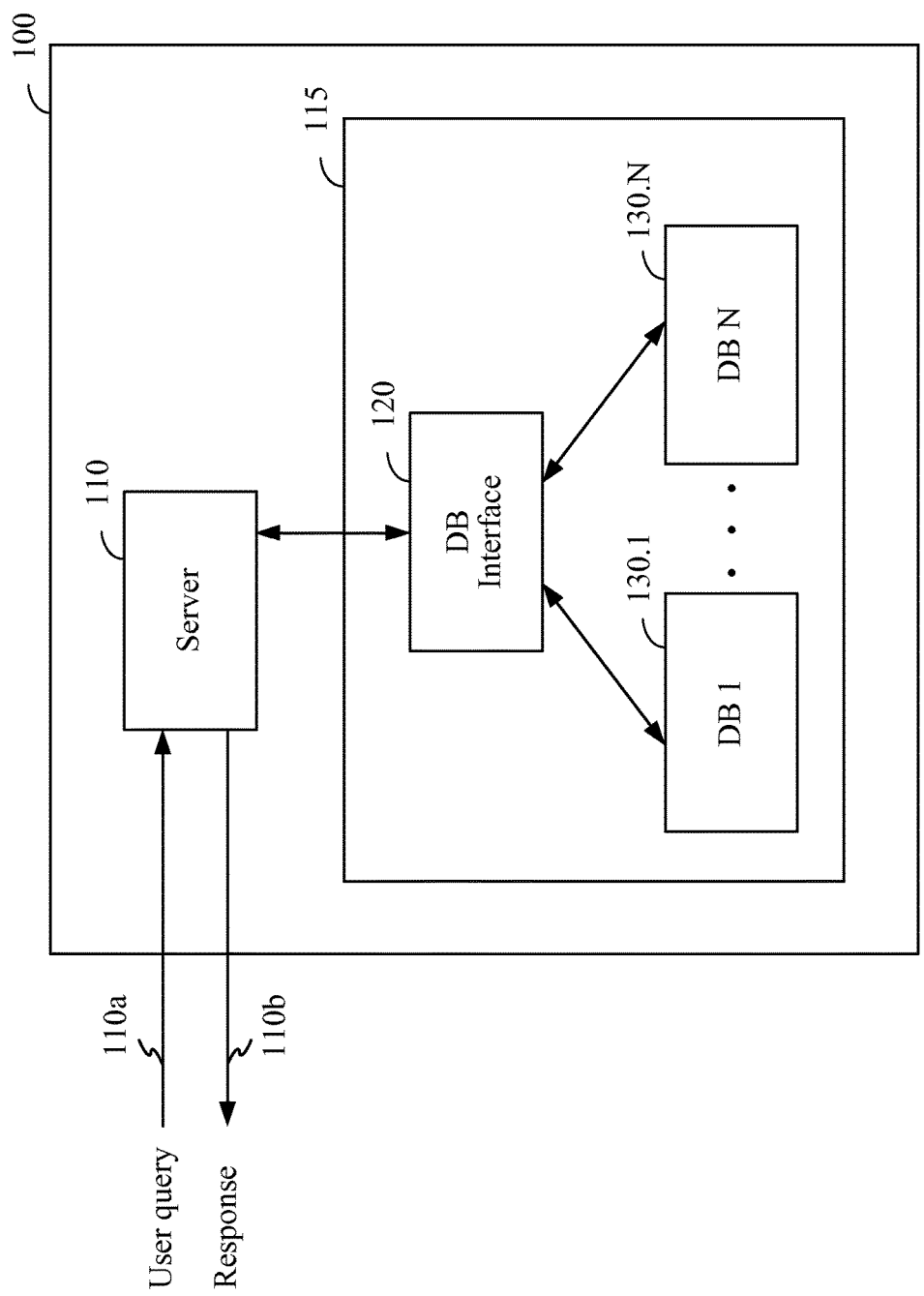
FIG. 1 shows an illustrative architecture for a database management system (DBMS).

FIG. 1 shows an illustrative architecture for a database management system (DBMS) 100. Note FIG. 1 is shown for illustrative purposes only, and is not meant to limit the scope of the present disclosure to any particular types of information that may be processed or stored in a database system.

In FIG. 1, a user (not shown) submits user query 110*a* to server 110 of database system 100, in response to which system 100 returns a response 110*b* to the user. User query 110*a* may request data from system 100 which fulfills certain conditions as specified by user query 110*a*. For example, in an exemplary usage scenario, user query 110*a* may request data corresponding to a designated user account, wherein the user account is associated with multiple advertisement campaigns (or "ad campaigns"). User query 110*a* may specifically request data (e.g., "filtered" data) fulfilling a certain condition, e.g., all ad campaigns whose titles contain a certain text string, such as "electronics."

User query 110*a* may also specify the manner in which filtered data should be displayed when returned by database 100 as response 110*b*. For example, query 110*a* may specify that all filtered data be alphabetically sorted, and may further request only data to be displayed corresponding to a certain page (e.g., page 10) of the sorted, filtered results.

Database 100 may parse user query 110*a* to determine which database objects are relevant to the query. It will be appreciated that database 100 may store database objects assigned to object types, e.g., as defined according to a system schema or hierarchy. For example, a schema may specify a "root" object type, representing a top-level category type of the schema. A root object type may be directly related to one or more first-level child object types, which may in turn be directly related to one or more second-level child object types, etc., according to a hierarchy of object types. An instance of an object type may be denoted herein as an "object."

For example, in an illustrative schema or hierarchy designed for an Internet advertising campaign (hereinafter "ad campaign") database, the root object type may correspond to "username," while a child object type of "username" may correspond to "account." The parent-child relationship in this case may also be symbolically represented herein as "username→account." The illustrative schema for an ad campaign database may further include the following relationships: "username→account→campaign→adgroup→keyword→bid," i.e., "username" is a parent of "account," which is a parent of "campaign," etc. Note alternative schemas may specify different relationships, e.g., one account may have many associated users. Any such alternative exemplary schemas are contemplated to be within the scope of the present disclosure.

Note other object types (whose parent-child relationships are not explicitly specified herein) may include, e.g., names of specific ads, targeting information, clicks, expenditures, impressions, editorial review data (e.g., editorial status associated with certain data, such as "approved" or "rejected," established on a per-country or per-language basis), advertisement intelligence data (e.g., bid amounts required for a keyword to reach a first page or achieve main line placement), etc. It will be understood that specific parent-child relationships are described herein for illustrative purposes only, and are not meant to limit the scope of the present disclosure to ad campaign databases, or to any particular entity schema or hierarchy types. Database systems storing other types of data besides user accounts or ad campaign data, and organized using alternative schemas, may readily utilize the techniques of the present disclosure.

In this specification and in the claims, a relationship between a first object type and a second object type descending directly from the first object type is denoted a "parent-child" relationship, with the first and second object types also denoted herein as the "parent" and "child," respectively. Alternatively, when a first object type is either a parent, a parent of a parent, a parent of a parent of a parent, etc., of a second object type, then the first object type is denoted an "ancestor" of the second object type, and the second object type in this case is denoted a "descendant" of the ancestor. Any ancestor-descendant relationship may also be denoted a "vertical relationship" herein. Furthermore, objects of the same type are said to have a "horizontal relationship." Note an ancestor→descendant relationship may be symbolically represented herein as, e.g., "account→ . . . →keyword." In particular, "X→ . . . →Y" may generally denote that X is an ancestor of Y, and/or X is a parent of Y.

Note any parent-child relationship may also be classified as an ancestor-descendant relationship, but an ancestor-descendant relationship need not also be a parent-child relationship (e.g., if the ancestor is a parent of a parent of the descendant). In this context, the root object type is understood to be an ancestor of all other object types in the hierarchy.

Note any object type may also have one or more associated attributes. For example, in the illustrative ad campaign schema described hereinabove, any keyword object may have an associated attribute "bid." Such a relationship between object type and attribute may be denoted as "keyword.bid" herein, and an expression such as "account→ . . . →keyword.bid" may refer to the "bid" attribute associated with the indicated "keyword" object, which further has the indicated "account" object as an ancestor.

Further note that, with any "primary" object, there may be associated one or more additional objects or tables. Such additional objects or tables may be classified as children of such "primary" objects, but may generally be read from or written to the DB system simultaneously with the "primary" object. For example, associated with a "keyword" object may be additional objects, e.g., "EditorialReasons," or "bids" (if they existed in their own table/object), that may generally be processed simultaneously with the "keyword" object.

In general, a database system such as system 100 may employ any of a variety of architectures for storing and retrieving data. For example, a centralized database architecture may store data using a single database entity. In other database architectures known as "distributed" databases, the database storage load may be distributed amongst a plurality of component databases. For example, in a "federated" database system (FDBS), a central system interface is coupled to a plurality of autonomous or semi-autonomous component databases. In some instances, the component databases may be spread out over several physical sites.

Compared to centralized database systems, distributed database systems may offer the advantages of scalable storage capacity and improved reliability. For example, data storage capacity may be distributed amongst multiple component databases, resulting in smaller size of the component databases along with faster access times. Furthermore, in systems utilizing data replication, if one component database fails, then other component databases may continue operating to meet the system requirements.

FIG. 1 shows an illustrative implementation wherein the underlying architecture of DBMS 100 includes a federated database system 115. In particular, server 110 is coupled to federated database system 115 via a database (DB) interface module 120, which is directly connected to a plurality of component databases 130.1, . . . , 130.N. Server 110 may submit user query 110*a* to federated database system 115 to extract the requested data.

In response to receiving user query 110*a*, DB interface module 120 may formulate a procedure to query the constituent databases 130.1, . . . , 130.N, to identify and retrieve the relevant data. In a federated database system, stored data may be partitioned and assigned to the multiple component databases according to, e.g., a horizontal fragmentation or "sharding" scheme. In particular, data corresponding to a plurality of horizontally related objects may be divided into "rows" by object, and each component database may store data corresponding to some of the rows.

For example, according to the illustrative ad campaign schema described hereinabove, a username object may have many account objects as children. A first component database, e.g., DB 130.1, of federated database system 115 may store rows corresponding to a first subset of the user's accounts, while a second component database may store rows corresponding to a second subset of the user's accounts, etc. A federation "key" may be assigned to each row, and each key may be associated with the component database storing the data for the corresponding row. As all data corresponding to a single row may generally be found in a single component database, specifying the federation key uniquely specifies the location of the row data to be retrieved.

State-of-the-art database systems supporting Internet advertising campaign and/or other "big data" applications are characterized by the requirements to allow end users to rapidly perform arbitrary sorting, filtering, and paginating operations over vast amounts of data. For example, in typical OLTP (online transaction processing) applications, hundreds of millions of records may need to be searched and sorted in under a second. The performance of a federated database system may be limited by the fact that, because rows are indexed by a federation key, all data associated with a federation key is located in a single component database. In this case, the size of the data for that federation key may be limited by the storage capacity of a single component database.

Furthermore, a federation key may generally be created to reference all rows in a database having specific column values lying within some pre-specified ranges. In this case, even though the number rows fulfilling the pre-specified conditions may be indeterminate, the total number and size of rows that can be supported for a federation key is nevertheless limited to the size of a single component database. For example, according to the illustrative ad campaign schema, to minimize database query response time, it may be desirable to limit the number of keywords per account to be approximately 100,000. However, as the actual number of keywords per account may greatly exceed 100,000 in some cases, it is difficult to achieve the desired performance using federation schemes.

It will further be appreciated that the bandwidth available to a single component database may be limited, and thus may introduce bottlenecks in the system, thereby also limiting speed (e.g., increasing latency) and performance.

Accordingly, it would be desirable to provide a novel and efficient database architecture that can store and process arbitrary amounts of data, with dynamic adjustment and optimization of system architecture based on network load for enhanced performance.

Figure 2:
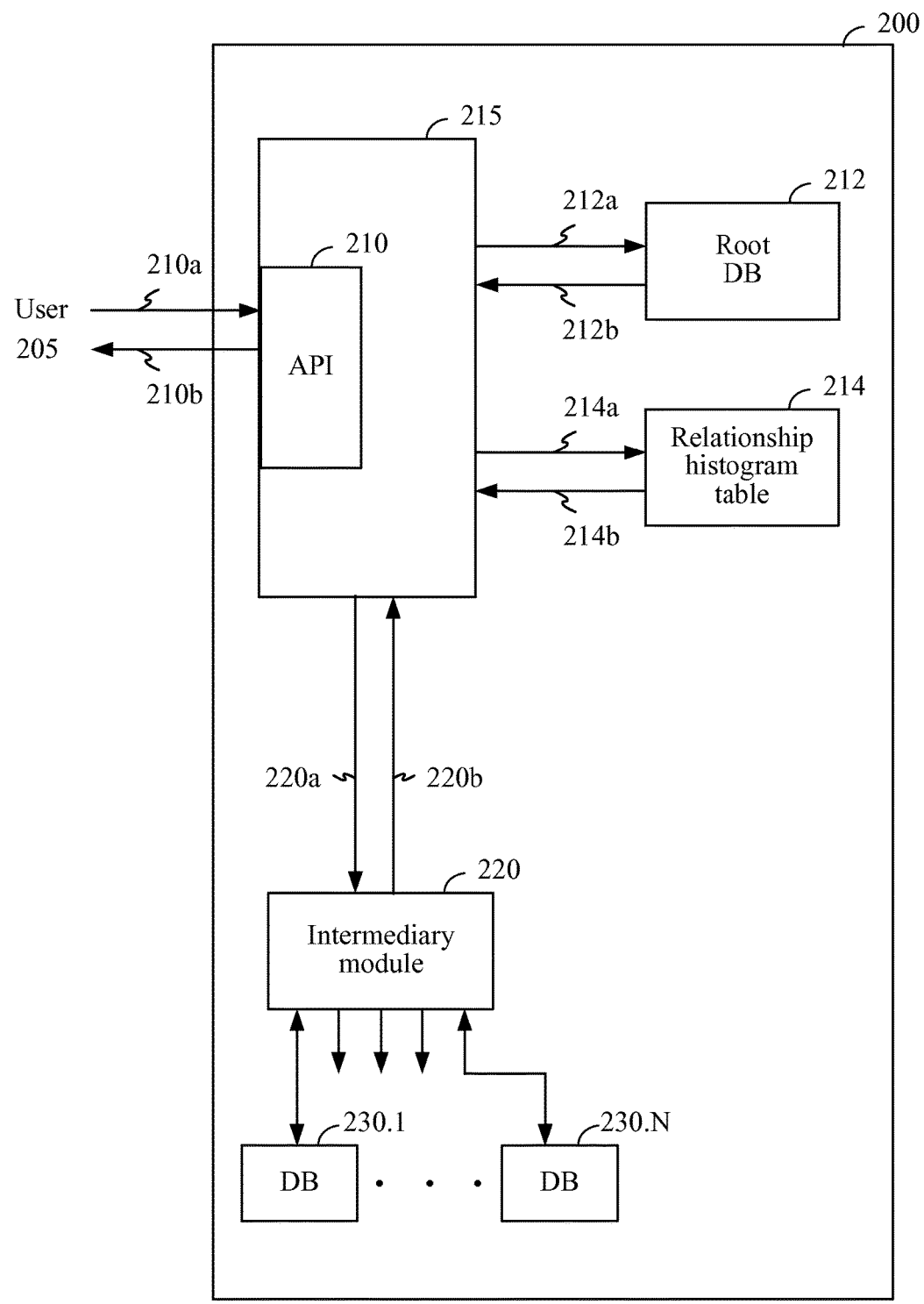
FIG. 2 illustrates an exemplary embodiment of a distributed database architecture or query processor according to the present disclosure.

FIG. 2 illustrates an exemplary embodiment 200 of a distributed database architecture or query processor according to the present disclosure. Note FIG. 2 is shown for illustrative purposes only, and is not meant to limit the scope of the present disclosure to any particular exemplary embodiment shown. It will be appreciated that the elements shown in FIG. 2 may correspond to functional blocks, and may be physically implemented in a variety of ways. For example, in certain exemplary embodiments, any of the elements shown may reside on one or more cloud computing platforms in a network, geographically dispersed over many physical sites. Alternatively, any or all of the elements shown may be physically provided in a central location. In certain exemplary embodiments, specific storage implementations may include "NoSQL" storage solutions such as Azure Table Storage/Blob Storage, S3 cloud storage, etc. Any such exemplary embodiments are contemplated to be within the scope of the present disclosure.

In FIG. 2, a database user 205 communicates with an application programming interface (API) module 210 (also denoted herein as "API") of database system 200. API 210 serves as a communications link between database system 200 and the outside world, e.g., by defining the protocols, procedures, functions, etc., that are used to communicate with database system 200. In particular, user 205 may submit user query 210a and receive response 210b through API 210. In an exemplary embodiment, user query 210a may be formatted and request similar information as described hereinabove with reference to user query 110a in FIG. 1.

In an exemplary embodiment, API 210 may accept user query 210a as a submitted HTTP GET request. The HTTP GET request may include a free-form string query formatted using an "Open Data Protocol" or "OData" data access protocol. The string query may contain embedded projection, filtering and sorting elements. In an exemplary embodiment, the string query may be formatted as an XML-defined object model in which parent object types and child object types are explicitly enumerated. The HTTP GET request may further include information specifying, e.g., the type of object against which a query should be performed, the identities of ancestor objects to which the query should be confined, and the number of objects to be returned and/or skipped by the query.

In an exemplary embodiment, API 210 is implemented on a central server 215, which performs high-level processing for system 200. Server 215 may be coupled to a root database 212 containing a list of all known root objects in the system. Server 215 may further be coupled to relationship histogram table 214. In an exemplary embodiment, table 214 maps all possible ancestor-child relationships for each root object to one or more component databases, denoted as 230.1 through 230.N in FIG. 2, wherein N represents the total number of component databases. An intermediary module 220 serves as an intermediary between server 215 and the plurality of component databases 230.1 through 230.N.

Note the depiction of intermediary module 220 in FIG. 2 is not meant to suggest that module 220 necessarily corresponds to a single physical element. In certain exemplary embodiments, intermediary module 220 may include multiple inter-related or autonomous or semi-autonomous entities, as further described hereinbelow with reference to FIGS. 5 and 6. In alternative exemplary embodiments, intermediary module 220 may include a single physical element. Such exemplary embodiments are contemplated to be within the scope of the present disclosure.

Figure 3:
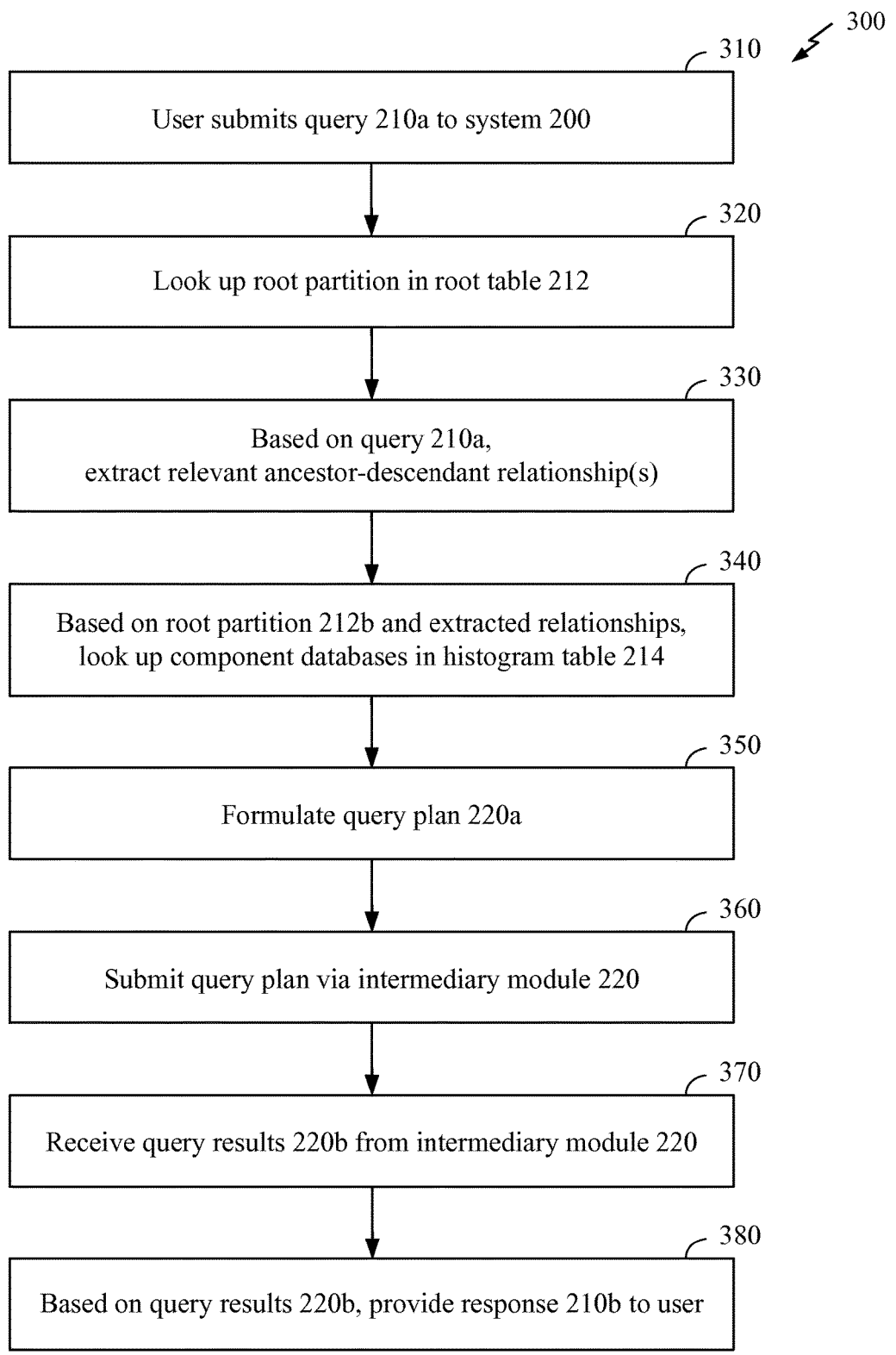
FIG. 3 illustrates an exemplary embodiment of a process executed by a central server in response to a user query.

FIG. 3 illustrates an exemplary embodiment 300 of a process executed by server 215 in response to user query 210a. Note FIG. 3 is shown for illustrative purposes only, and is not meant to limit the scope of the present disclosure to any particular method for processing user query 210a by server 215 shown.

In FIG. 3, at block 310, user 205 submits query 210a to system 200. In an exemplary embodiment, query 210a may be submitted to system 200 via API 210. Query 210a may generally specify parameters characterizing data that the user desires to retrieve from system 200. In an exemplary embodiment, query 210a may specify, e.g., object type(s), parameter values, and/or other identifying conditions of specific data in the database. Query 210a may further specify the manner in which retrieved data is to be displayed, sorted, filtered, etc.

For example, an example query 210a for the illustrative ad campaign schema described hereinabove may be denoted herein as a "first illustrative query." The first illustrative query may specify that user 205 desires to retrieve from system 200 "keyword" objects associated with a given "account" object, wherein the keywords contain a certain text string such as "abc," and further have corresponding "bid" values greater than 2. The first illustrative query may further specify that only the top two results as alphabetically ordered (or "sorted") by keyword text are to be returned in response 210b.

At block 320, server 215 submits a root object query 212a, and retrieves a root partition index 212b from root DB 212. Root partition index 212b enables server 215 to locate entries in relationship histogram table 214 corresponding to a particular root object associated with the query. For example, in the first illustrative query, the root object may correspond to the user name of user 205, and root partition index 212b may be a key identifying the partition(s) in relationship histogram table 214 corresponding to that user name.

At block 330, at least one ancestor-descendant relationship 214a relevant to query 210a is extracted from the query parameters.

In an exemplary embodiment, the extracted ancestor-descendant relationship may be any ancestor-descendant relationship relevant to query 210a. For example, for the first illustrative query, block 330 may extract the vertical relationship "account→ . . . →keyword," or any other vertical relationship, from the query. In an exemplary embodiment, the extracted ancestor-descendant may be the relationship having the greatest vertical separation between object types in query 210a.

At block 340, using root partition index 212b, server 215 retrieves from relationship histogram table 214 a signal 214b indicating the identities of any component databases (e.g., 230.1 through 230.N in FIG. 2) storing data relevant to the extracted ancestor-descendant relationship 214a for the root object. Such component databases are also designated herein as "relevant component databases," and signal 214b may also be denoted herein as a "histogram output signal." Note depending on user query 210a, there may generally be at least one relevant component database.

For example, for the first illustrative query, histogram output signal 214b may identify a set of three component databases, e.g., 230.1, 230.3, 230.5, as storing data relevant to the query.

It will be appreciated that the provision of a root DB 212 separately from relationship histogram table 214 may advantageously speed up retrieval of histogram output signal 214b, by adopting a two-step look-up approach (e.g., first look up the root object partition in DB 212, then look up the vertical relationship in histogram table 214). Nevertheless, it will be appreciated that in alternative exemplary embodiments, root DB 212 and relationship histogram table 214 may be implemented using a single look-up table. Furthermore, in yet alternative exemplary embodiments, more than two look-up tables may be provided for the purpose of generating histogram output signal 214b. Accordingly, any exemplary embodiment may utilize at least one table for the purposes described. Such alternative exemplary embodiments are contemplated to be within the scope of the present disclosure.

At block 350, server 215 dynamically configures a query plan 220a to query the component databases for data, based on user query 210a and histogram output signal 214b. Query plan 220a may contain certain parameters and conditions from user query 210a, expressed in a format or protocol suitable for communication with intermediary module 220 and/or component databases 230.1 through 230.N.

In an exemplary embodiment, query plan 220a may also specify to intermediary module 220 how and which component databases are to be queried to extract the required data. For example, query plan 220a may include a list of component databases, e.g., all component databases in histogram output signal 214b, for intermediary module 220 to query. Alternatively, query plan 220a may include a plurality of sub-lists 221a.1, 221a.2, etc., and each sub-list may contain a subset of the component databases listed in histogram output signal 214b. In an exemplary embodiment, multiple sub-lists may be generated and assigned to multiple intermediary nodes within a single intermediary module.

To formulate query plan 220a, e.g., to select appropriate intermediary nodes (IMN's) and assign component databases to the selected IMN's, server 215 may employ techniques for determining what leaf nodes to select for a specific query, wherein the leaf nodes correspond to candidate IMN's. For example, the query plan may be formulated accounting for predetermined traffic and/or connectivity constraints present at the IMN's and component databases. Techniques employed for formulating the query plan may include, e.g., solutions to a two-dimensional knapsack problem, etc., and such techniques are contemplated to be within the scope of the present disclosure.

In an exemplary embodiment, intermediary module 220 may expose a queryable Windows Communication Foundation (WCF) service to server 215. Server 215 may asynchronously call a WCF service running on each of a plurality of intermediary nodes of intermediary module 220.

At block 360, server 215 submits query plan 220a to intermediary module 220. In an exemplary embodiment, responsive to receiving query plan 220a, intermediary module 220 may establish connections with the specific component databases as directed by query plan 220a to retrieve the desired query results. Exemplary operations performed by intermediary module 220 are described, e.g., with reference to FIGS. 4, 5, and 6 hereinbelow.

At block 370, server 215 receives query results 220b from intermediary module 220.

At block 380, based on received query results 220b, server 215 provides query response 210b to user 205 via API 210.

It will be appreciated that relationship histogram table 214 and/or root DB 212 may generally be modified and updated during all insert and load balancing operations performed on the database.

Figure 4:
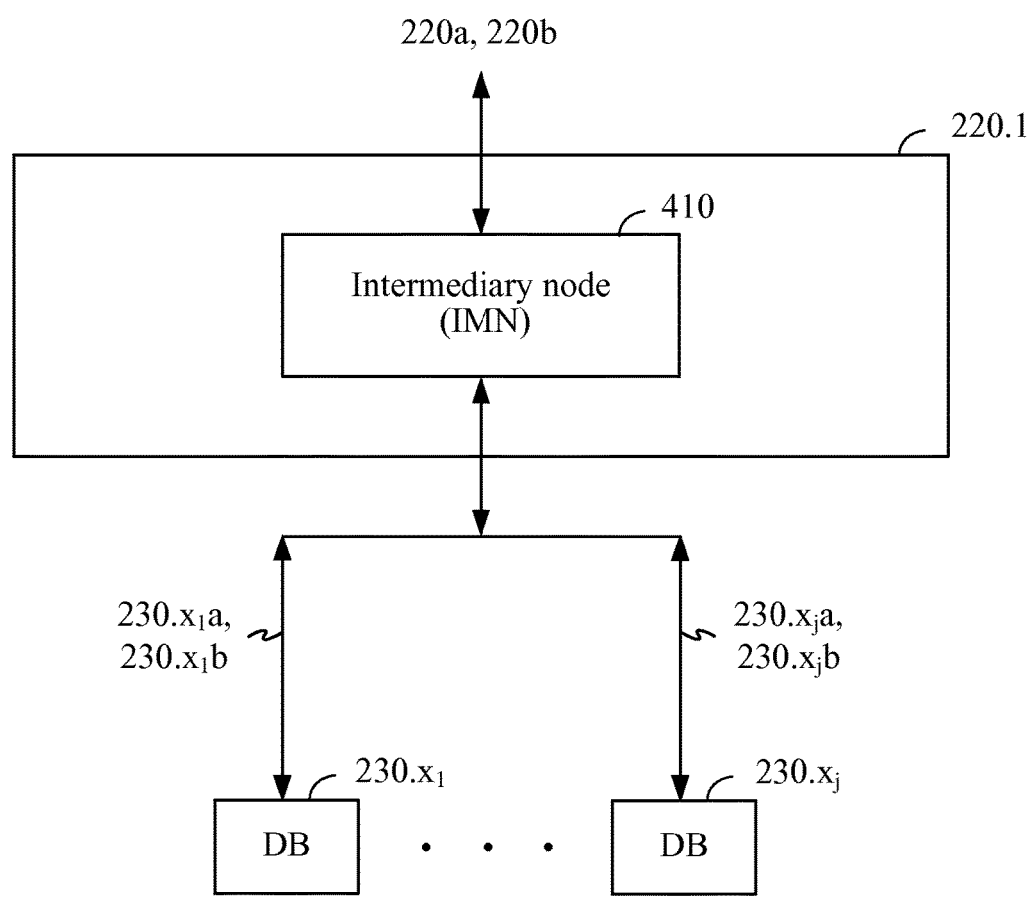
FIGS. 4, 5, and 6 illustrate exemplary configurations of an intermediary module.
Figure 5:
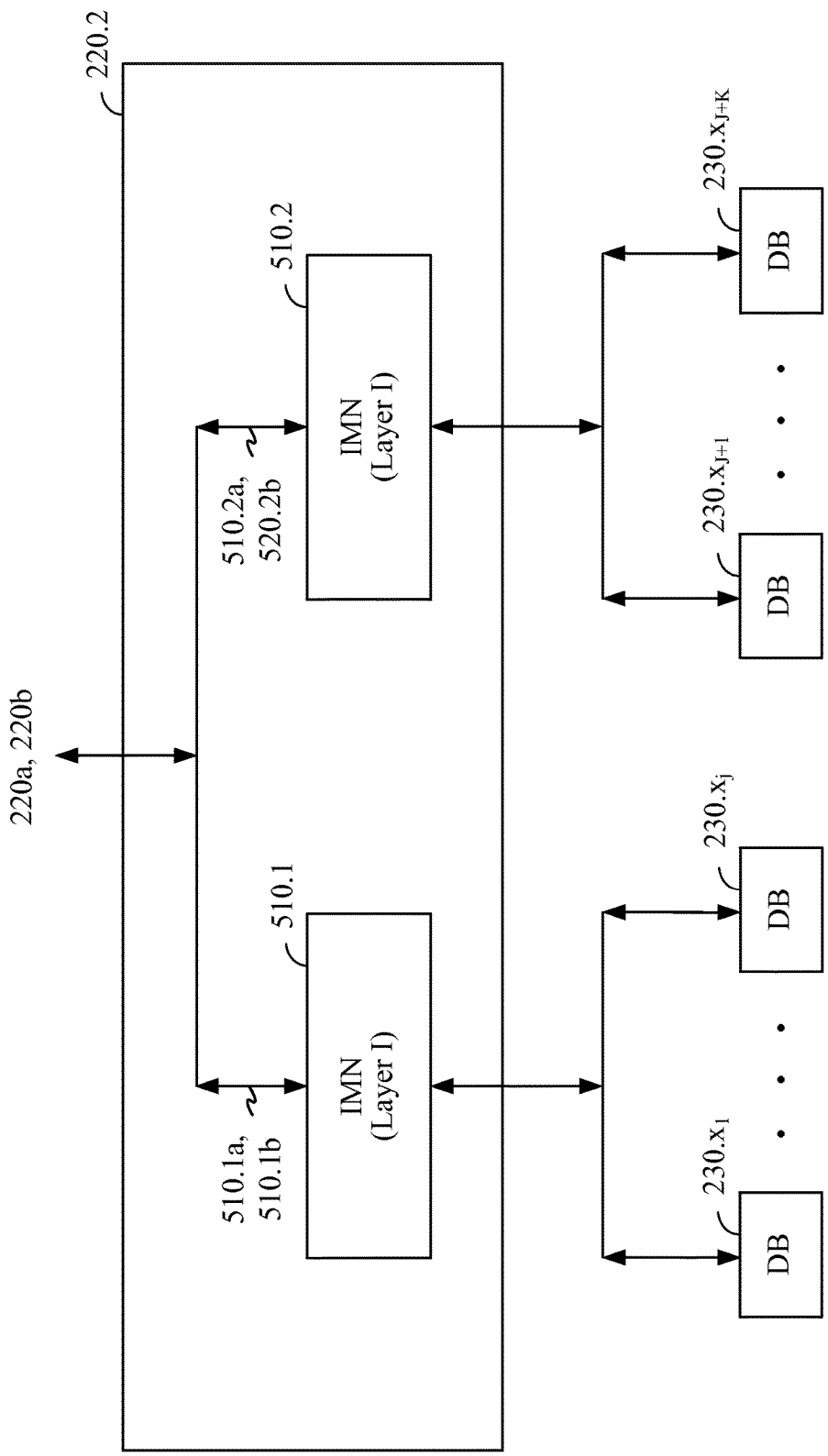
Figure 6:
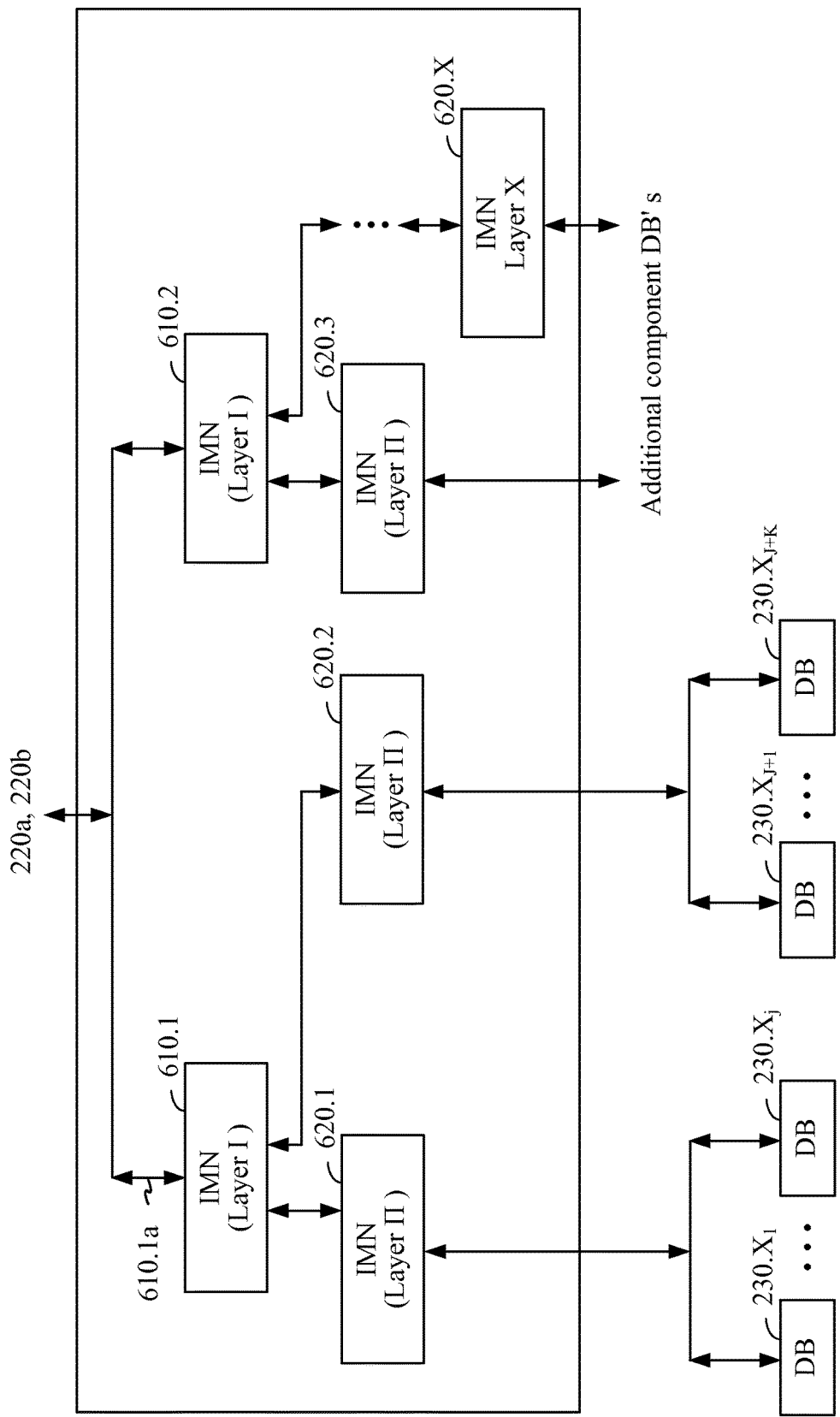

FIGS. 4, 5, and 6 illustrate exemplary configurations 220.1, 220.2, 220.3, respectively, of intermediary module 220. Note FIGS. 4, 5, and 6 are shown for illustrative purposes only, and are not meant to limit the scope of the present disclosure to any particular configuration, hierarchy, or number of intermediary nodes shown. It will be appreciated that any number of intermediary nodes and layers of intermediary nodes may be accommodated by the techniques of the present disclosure. It will further be appreciated that the techniques of FIG. 3 may also be utilized with one or more intermediary modules not necessarily having the architectures shown in FIGS. 4, 5, and 6 (e.g., server 215 may even be directly coupled to component databases without the provision of any intermediary nodes), and such alternative exemplary embodiments are contemplated to be within the scope of the present disclosure. Note an intermediary node is generally denoted herein as an "IMN."

In FIG. 4, intermediary module 220.1 includes a first intermediary node (IMN) 410. In an exemplary embodiment, IMN 410 may correspond to a cloud computing device running a cloud computing platform, e.g., Microsoft Azure. IMN 410 may be coupled, e.g., directly coupled, to a plurality of component databases, e.g., $230.x_1$ through $230.x_j$ as directed by query plan 220a, wherein variables $x_1$ through $x_j$ may each refer to arbitrary ones of component DB's 230.1 through 230.N, and J denotes the total number of component databases assigned to IMN 410 by query plan 220a.

Upon receiving query plan 220a, intermediary module 220 may submit component queries specifically to each of component databases $230.x_1$ through $230.x_J$. For example, component query $230.x_1a$ is submitted to component DB $230.x_1$, e.g., detailing the parameters, conditions, etc., specified in user query 210a. Similarly, component query $230.x_Ja$ is submitted to component DB $230.x_J$, etc. Note all component queries may generally contain the same query parameters/conditions. Alternatively, each component query request may contain query parameters/conditions specifically tailored to the receiving component DB, if such DB-specific information is available.

Upon receiving and processing the corresponding component queries, component databases $230.x_1$ through $230.x_J$ may return query results $230.x_1b$ through $230.x_Jb$ to intermediary module 220. Based on the returned query results $230.x_1b$ through $230.x_Jb$, IMN 410 may return query results 220b to server 215. In an exemplary embodiment, IMN 410 may locally perform further sorting, filtering, and paginating functions on query results $230.x_1b$ through $230.x_Jb$ prior to transmitting query results 220b to server 215.

In an exemplary embodiment, IMN 410 may serve to throttle DB traffic when query volume is high, and to rebalance pooled connections to DB servers based on user demand.

In an exemplary embodiment, certain enhancements may be adopted to improve the performance of the distributed database system according to the present disclosure. In particular, when multiple object inserts are desired to be performed across multiple databases of the distributed database system, it would be desirable to ensure that all inserts are recognized at the same time globally across the system, so that no user sees inconsistent states when querying each DB of the system. For example, a single transaction submitted by user 205 via API 210 may specify the insertion of a plurality of keywords across multiple component DBs. In an exemplary embodiment, a protocol of the system may be defined, e.g., via API 210, specifying that: 1) User 205 is limited to inserting only insert objects under a single parent at any given time; and/or 2) all children of a single parent are placed in the same component DB (even though all descendants of an object need not be stored in the same DB). Note such an exemplary protocol is described for illustrative purposes only, and is not meant to limit the scope of the present disclosure to only exemplary embodiments accommodating such a protocol. In an exemplary embodiment, the exemplary protocol may be combined with other types of distributed transaction protocols, e.g., 2-phase commit, Paxos, etc. Such alternative exemplary embodiments are contemplated to be within the scope of the present disclosure.

It will be appreciated that while intermediary module 220 may be configured (e.g., by query plan 220a) to utilize only one IMN 410 in certain instances as shown in FIG. 4, module 220 may alternatively be configured to utilize a plurality of IMN's. FIG. 5 illustrates an exemplary configuration 220.2 of intermediary module 220 incorporating such a plurality of IMN's. Note FIG. 5 is shown for illustrative purposes only, and is not meant to limit the scope of the present disclosure to any particular number of IMN's shown.

In FIG. 5, intermediary module 220.2 includes two Layer I intermediary nodes 510.1, 510.2. In an exemplary embodiment, query plan 220a received from server 215 includes a first query plan 510.1a for IMN 510.1, and a second query plan 510.2a for IMN 510.2. The separate query plans 510.1a, 510.2a for IMN's 510.1, 510.2 may direct each of the IMN's to query distinct sets of component databases.

Note while two Layer I intermediary nodes 510.1, 510.2 are illustratively shown in FIG. 5, it will be appreciated that the techniques of the present disclosure may readily accommodate an arbitrary number of intermediary nodes at any Layer of intermediary nodes, in order to optimize IMN computational resources and/or bandwidth of communications between IMN's and component databases. For example, in an alternative exemplary configuration (not shown), three or more Layer I intermediary nodes may be provided in intermediary module 220 to directly interface with server 215. In an exemplary embodiment, to ensure high-speed data throughput, the number of Layer I IMN's that can be directly coupled to server 215 may be limited to a maximum number, e.g., six Layer I IMN's. Alternative exemplary embodiments utilizing any number of intermediary nodes are contemplated to be within the scope of the present disclosure.

It will be appreciated that by dividing the task of query processing amongst two or more intermediary nodes as shown with reference to IMN's 510.1, 510.2 in FIG. 5, the load and bandwidth handled by each individual IMN may be reduced. Furthermore, server 215 may optimally and dynamically configure query plan 220a to select appropriate IMN's, and to allocate the selected IMN's to component databases, based on load balancing, bandwidth optimization, IMN-component database affinity, connection pooling, number of issued concurrent queries to a given IMN or component database, and/or other considerations.

FIG. 6 illustrates an exemplary configuration 220.3 of intermediary module 220 incorporating multiple layers of intermediary nodes. Note FIG. 6 is shown for illustrative purposes only, and is not meant to limit the scope of the present disclosure to any particular number of layers of intermediary nodes shown.

Note a "layer" may generally denote a relationship between a first entity that submits a query and a second entity that receives the query. In this case, the first entity may be referred to as occupying a "higher" layer than the second entity. Alternatively, a "layer" may denote a relationship between a first entity that returns a query response and a second entity that receives the query response. In this case, the second entity may be referred to as occupying a "higher" layer than the first entity. For example, server 215 occupies a higher layer than intermediary module 220 or any IMN in intermediary module 220, and component databases 230.1 through 230.N generally occupy the lowest layers in the system.

In FIG. 6, module 220.3 includes Layer I IMN 610.1, which is in turn coupled to two Layer II IMN's 620.1, 620.2, and Layer 1 IMN 610.2 coupled to a plurality of Layer II IMN's including Layer II IMN 620.3. IMN 620.3 is further coupled to a plurality of lower-layer IMN's, of which one IMN at a lower layer "X" is illustratively denoted as Layer X IMN 620.X.

In an exemplary embodiment, any IMN may divide up the task of processing a query plan amongst two or more IMN's at one or more "lower" layers. For example, Layer I IMN 610.1 may receive a query plan 610.1a from server 215 specifying that ten component databases are to be queried. In response, IMN 610.1 may configure Layer II IMN's 620.1, 620.1 to query five component databases each. Alternatively, an IMN may distribute component bases in any arbitrary manner (e.g., including non-uniform distribution)

amongst lower-layer IMN's to best accommodate current traffic/bandwidth conditions locally present at any IMN and/or component databases.

It will be appreciated that the techniques of the present disclosure may generally accommodate an arbitrary number of layers of intermediary nodes. For example, as shown in FIG. 6, Layer I IMN 610.2 may be separated from Layer X IMN 620.X by an arbitrary number of layers. Such alternative exemplary embodiments utilizing any number of intermediary nodes and layers of intermediary nodes are contemplated to be within the scope of the present disclosure.

In an exemplary embodiment, any intermediary node of intermediary module 220 may be configured to dynamically adjust for whether and how it will submit a query plan to lower-layer nodes. For example, a plurality of cloud computing servers may each be capable of serving as an intermediary node, and/or dynamically connecting with a central server, other intermediary nodes (e.g., higher or lower layers), and/or component databases based on dynamic configuration. In an exemplary embodiment, traffic data and outstanding queries may be broadcast from each node to all nodes, e.g., using intermediary nodes. In an exemplary embodiment, one "leader" node (not shown) could be responsible for computing better a connectivity pattern and then broadcasting changes to the routing tables to lower-layer IMN's in response to current traffic and data signals.

Note the designation of any IMN as corresponding to a given "layer" is made for logical descriptive purposes only, and is not meant to suggest that the physical or computational architecture of a higher-layer IMN in any way differs from that of a lower-layer IMN. Furthermore, the architecture of a central server may also be built using the same physical or computational architecture as an IMN, and the differences described hereinabove for central server 215 and any IMN may only apply to functional differences, as opposed to physical or computational or other types of differences. Exemplary embodiments wherein any or all of central server 215, higher-layer IMN's, and lower-layer IMN's are all implemented using cloud computing platforms are contemplated to be within the scope of the present disclosure.

Figure 7:
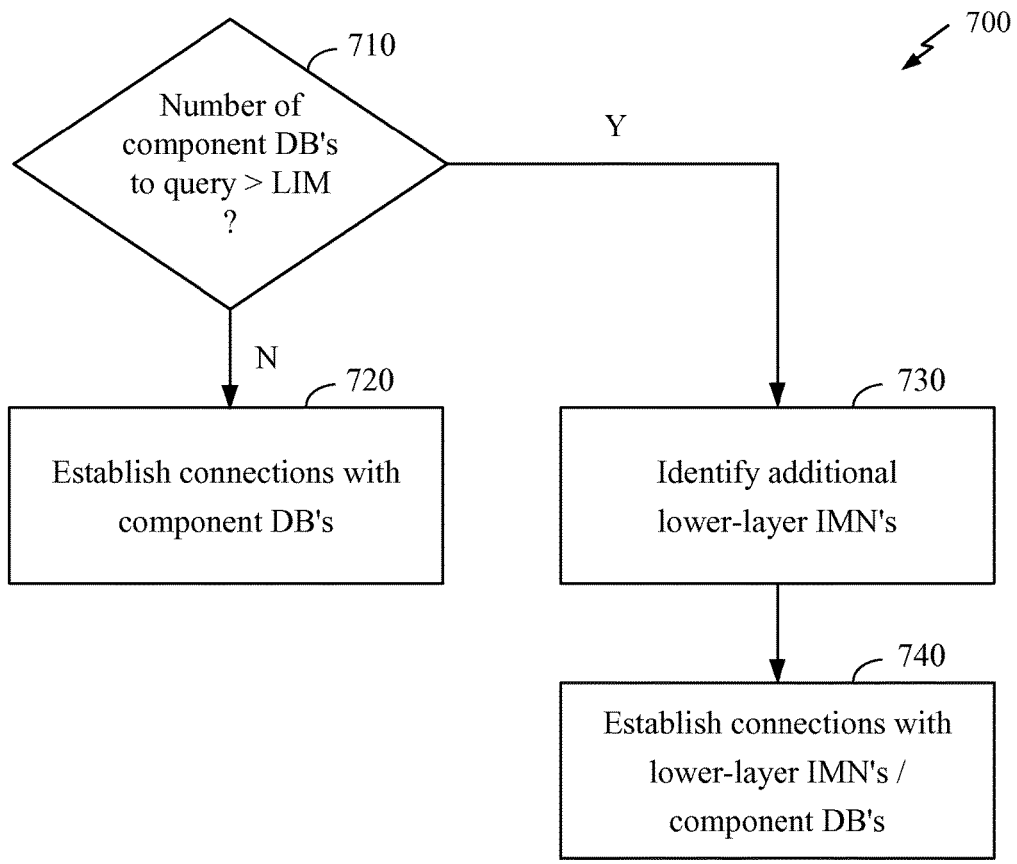
FIG. 7 illustrates an exemplary embodiment of a method performed by a central server or by an intermediary node (IMN) to process a query plan.

FIG. 7 illustrates an exemplary embodiment 700 of a method performed by server 215 or by an IMN to process a query plan. Method 700 may be executed by any of server 215 and IMN's 410, 510, 610, 620, etc., shown in FIGS. 4, 5, and 6. Note FIG. 7 is shown for illustrative purposes only, and is not meant to limit the scope of the present disclosure to any particular techniques for processing query plans shown.

In FIG. 7, at block 710, it is determined whether the number of component databases to query exceeds a maximum number LIM. In an exemplary embodiment, the number of component databases to query may be derived from a query plan submitted to the IMN by a higher-layer IMN, or by server 215. In an exemplary embodiment, LIM may be a design parameter predetermined to limit the time required to aggregate all results from lower layers.

If the determination at block 710 is "NO," then the IMN may establish connections with the component DB's to submit queries at block 720, e.g., as illustrated in any of FIGS. 4, 5, and 6. If the determination at block 710 is "YES," then the method 700 may proceed to block 730.

At block 730, the IMN may identify additional lower-layer IMN's to which one or more of the component databases may be assigned. The IMN may further generate new query plans specifically for the identified lower-layer IMN's.

In an exemplary embodiment, the lower-layer IMN's may be identified based on factors such as current load or bandwidth available at the candidate IMN, physical or system proximity of a candidate IMN to assigned component databases, etc. For example, lower-layer IMN's experiencing a minimal amount of query traffic may be preferred by the query plan. In an exemplary embodiment, the formulated query plan may seek to evenly distribute the number of component databases to be queried amongst the plurality of identified additional lower-layer IMN's.

In an exemplary embodiment, the formulated query plan may further seek to minimize the total number of IMN's needed to perform a given query.

At block 740, the IMN establishes connections with the identified lower-layer IMN's and/or component databases, and submits the queries according to the formulated query plan. Note for any query plan, an IMN may be configured to establish connections with only lower-layer IMN's, or to establish connections with only component databases, or to simultaneously establish connections with both component databases and lower-layer IMN's, to submit queries.

In an exemplary embodiment, any IMN may further perform conversion of parameters and/or conditions specified in user query 210a into a format for communication with the component databases. For example, an IMN may convert OData-based user query 210a into a Transact-Structured Query Language (T-SQL) query that can be directly executed by the component databases.

In certain instances, depending on the parameters of user query 210a, not all query results extracted from a lower layer need to be returned to a higher layer. For example, if user 210 only requests to view a first page of data meeting the parameters of user query 210a, then query plan 220a may specify that intermediary module 220 return as query results 220b only those data records that are to be displayed on a first page. In particular, a single page of data may display only a limited number of data records, e.g., the top 100 records, while the total number of data records returned from component databases may be much larger, e.g., in the millions.

In an exemplary embodiment, query results from a lower layer IMN or component DB may first be locally aggregated at an IMN prior to being transferred to a higher layer IMN or server 215. For example, aggregation may include operations such as sorting, filtering, and/or paginating the returned query results. Such local IMN processing of query results may be performed based on user-specified parameters as derived from the query plan. In an exemplary embodiment, to save bandwidth and computation load, each IMN may sort, filter, and paginate the query results returned from a lower layer, before passing the results to a higher layer.

Figure 8:
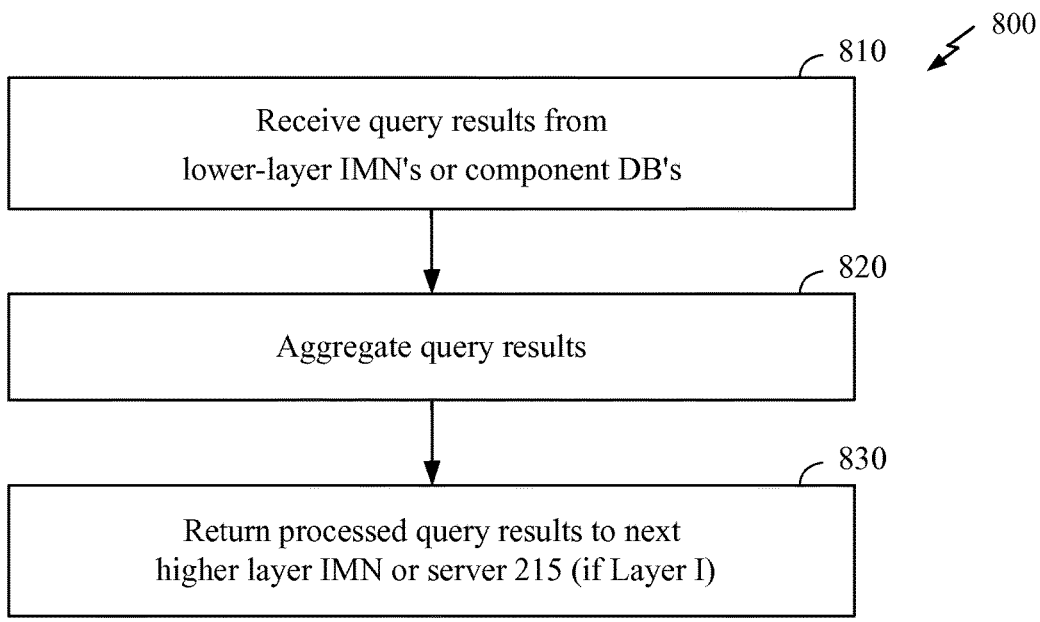
FIG. 8 illustrates an exemplary embodiment of a method performed by an IMN to process query results received from one or more lower-layer IMN's and/or one or more component databases.

FIG. 8 illustrates an exemplary embodiment 800 of a method performed by an IMN to process query results received from one or more lower-layer IMN's and/or one or more component databases. Method 800 may be executed by any of server 215 and IMN's 410, 510, 610, 620, etc., shown in FIGS. 4, 5, and 6. Note FIG. 8 is shown for illustrative purposes only, and is not meant to limit the scope of the present disclosure to any particular techniques for processing query results shown.

In FIG. 8, at block 810, query results are received from one or more lower-layer IMN's and/or one or more component databases.

At block 820, the received query results may be aggregated to generate processed data records. In an exemplary embodiment, aggregation may include sorting, filtering, or paginating.

For example, for the illustrative ad campaign schema, assume a user query 210a seeks the first 10 records (e.g., records #1 through #10), alphabetically sorted by keyword, of data objects having keyword bid greater than 2. Further assume the query plan utilizes the configuration shown in FIG. 5, e.g., two IMN's 510.1 and 510.2 are assigned, and each of IMN's 510.1 and 510.2 retrieve 10 unsorted records from their corresponding component DB's. In an exemplary embodiment, per processing performed at block 820, each of IMN's 510.1 and 510.2 may alphabetically sort the 10 retrieved records by keyword, and extract the top 10 results to generate processed data records for transmitting to a higher layer.

At block 830, the processed data records from block 820 are returned to a higher-layer IMN or server 215, e.g., if the IMN implementing method 800 is itself a Layer I IMN.

Per the description hereinabove, it will be appreciated that the top n results of a user's query may readily be calculated by performing a sort over intermediate results, and passing the top n results to each calling node. On the other hand, it may not be as straightforward to identify elements starting from the (n+1)-th element in a sort order, especially for a large value of n. For example, per the illustrative ad campaign schema described hereinabove with reference to FIG. 8, assume user query 210a seeks not the first 10 records, but rather the first record to be displayed on the 200$^{th}$ page of results (e.g., record #1991, assuming 10 records are displayed per page).

For large values of n, it may be impractical to expand a sort buffer size used at each IMN to store all elements up to the n-th element. In these circumstances, it may be advantageous to provide techniques to locally determine at IMN's whether any retrieved data records can be discarded in calculating the (n+1)-th value.

Figure 9:
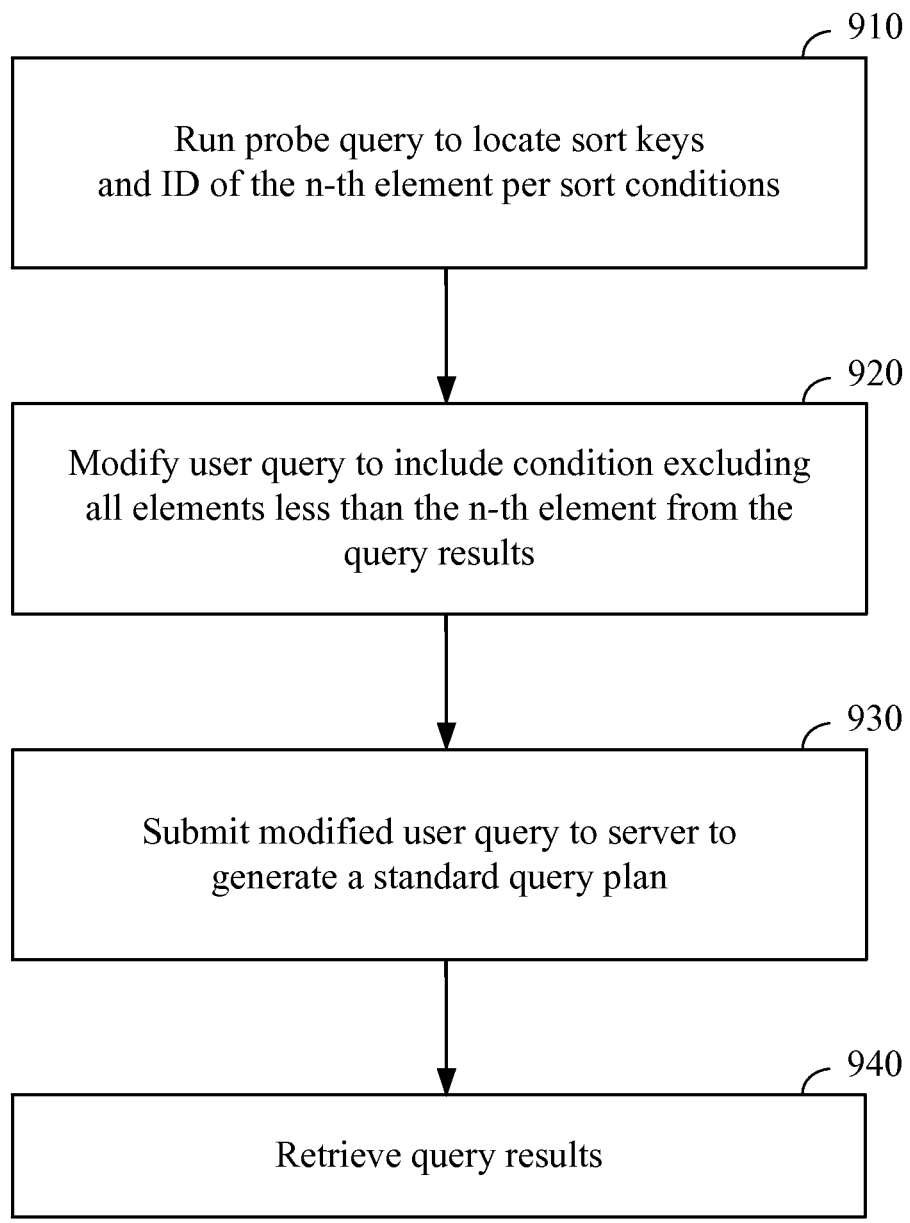
FIG. 9 illustrates an exemplary embodiment of a method for efficiently determining an (n+1)-th sorted data record.

FIG. 9 illustrates an exemplary embodiment 900 of a method for efficiently determining an (n+1)-th sorted data record. Method 900 may be executed, e.g., by any of server 215 and IMN's 410, 510, 610, 620, etc., shown in FIGS. 4, 5, and 6. Note FIG. 9 is shown for illustrative purposes only, and is not meant to limit the scope of the present disclosure to database systems employing the techniques shown.

In FIG. 9, at block 910, a "probe query" is run to locate sort keys and ID of the n-th element per the sort conditions. In an exemplary embodiment, block 910 may be implemented as described, e.g., with reference to block 910.1 in FIG. 10.

For example, a "second illustrative query" may request the 101$^{st}$ element in a list of alphabetically sorted keywords. Accordingly, n may correspond to 100, and a probe query would be run at block 910 to identify the 100$^{th}$ data record or element. For illustrative purposes, it is assumed that the 100$^{th}$ element contains the keyword "marketplace." In this instance, the "keyword" data object is also referred to as the "sort parameter."

At block 920, user query 210a may be modified to formulate a second query with search parameters that exclude the first n results. The modified user query is denoted herein as 210a'.

For example, according to the results obtained for the second illustrative query at block 910, modified user query 210a' may include a query for keywords excluding "marketplace" and all keywords alphabetically preceding "marketplace."

At block 930, modified user query 210a' is used to generate a standard query plan, e.g., as described with reference to query plan 220a hereinabove. Search results associated with modified user query 210a' are then retrieved.

At block 940, query results corresponding to the modified user query 210a' are retrieved.

Note blocks 920-940 may also be collectively referred to herein as performing a step of retrieving results from at least one component DB using a modified query excluding the first n results returned.

Figure 10:
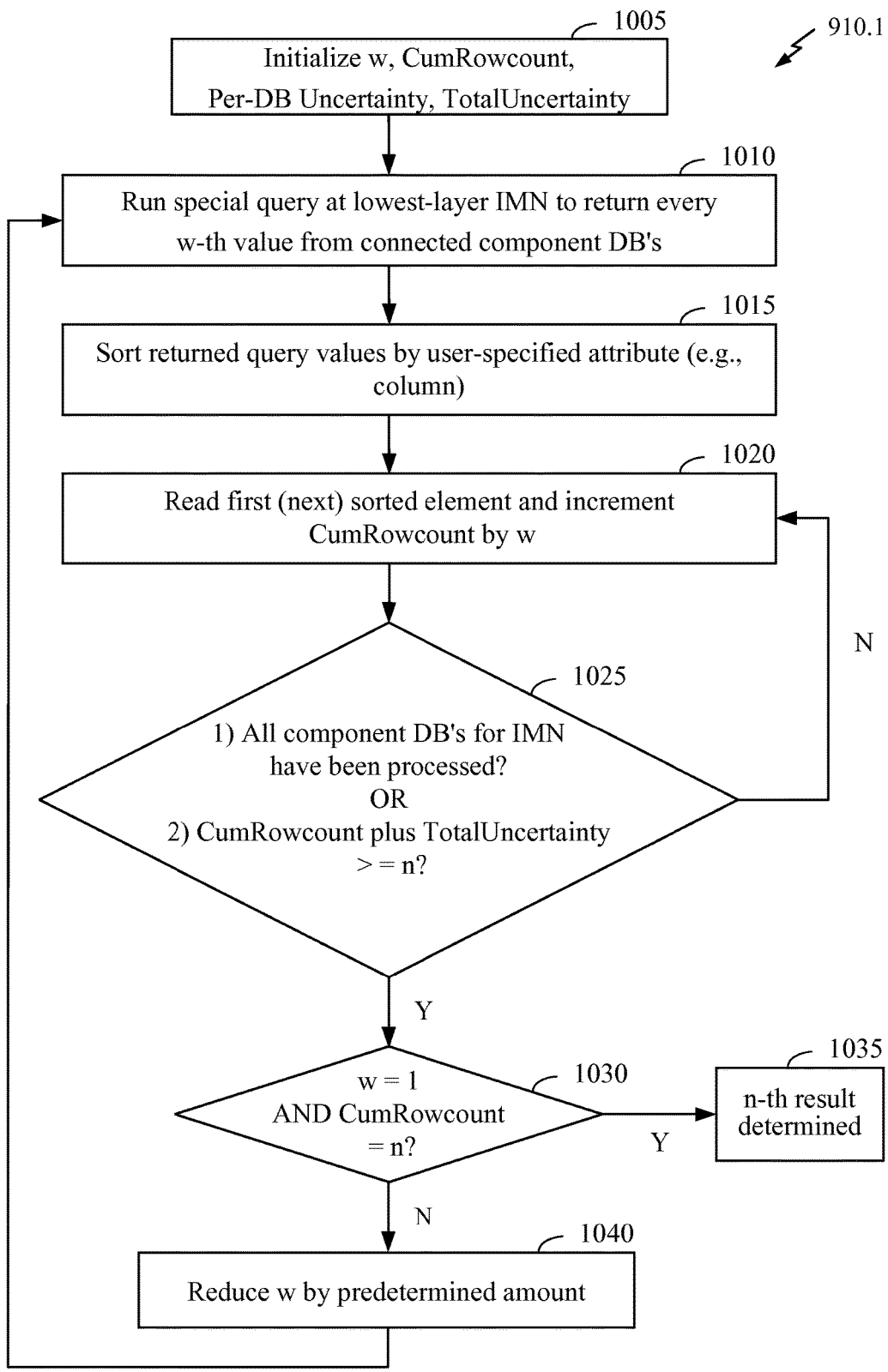
FIG. 10 illustrates an exemplary embodiment of techniques for running a probe query to find the n-th element.

FIG. 10 illustrates an exemplary embodiment 910.1 of block 910 for running a probe query to find the n-th element. Note FIG. 10 is shown for illustrative purposes only, and is not meant to limit the scope of the present disclosure to any particular techniques for finding the n-th element.

In FIG. 10, at block 1005, initializations are performed. In particular, a variable w, corresponding to a skip-read window size, is initialized. For example, w may be initialized to a value corresponding to, e.g., n divided by 1000, further divided by a total number of component databases queried. It will be appreciated that a larger value of w may generally correspond to coarser granularity and faster performance. Note while w may be illustratively described herein as corresponding to a single common value for all component databases, it will be appreciated that w may generally be independently chosen (e.g., as DB-specific values) for each component DB. Such alternative exemplary embodiments are contemplated to be within the scope of the present disclosure.

A counter variable CumRowcount is further initialized, e.g., to 0. CumRowcount may correspond to, e.g., a running count of the cumulative number of rows that have been sorted across all component DB's.

A variable "Per-DB Uncertainty" is further initialized at block 1005. Per-DB Uncertainty may correspond to the number of rows that are present between a current row read in each component DB, and the next row to be read from that DB. Note Per-DB Uncertainty will depend on the size of w chosen for a component DB. In particular, if no records have yet been read from a DB, then the Uncertainty for that DB may equal to w. On the other hand, if a record has already been read from a DB, and at least one record further remains to be read from that DB, then Uncertainty for that DB may equal w−1. Finally, if all records have been read from that DB, then Uncertainty will be equal to 0 for that DB. TotalUncertainty is defined as the running sum of Per-DB Uncertainty over all component DB's.

At block 1010, a special query is run at a lowest-layer IMN to sample every (post-sorted) w-th data record from each component DB connected to the lowest-layer IMN's.

At block 1015, the sampled query values are cumulatively sorted over all component DB's by the user-specified attribute (e.g., a user-specified column of a data record row). Each inserted element may be tagged or identified by the component DB from which it was extracted. In an exemplary embodiment, the sort may be performed by being inserted into a binary heap, and the binary heap sorted according to the sort attribute.

At block 1020, a first (or next) sorted sampled element is read, and the cumulative counter is incremented by w.

At block 1025, a condition is evaluated to determine the next step. In particular, 1) if all component DB's for the lowest-layer IMN have been processed, OR 2) if CumRowcount plus TotalUncertainty (the sum also denoted herein as the "uncertainty window") is greater than or equal to n, then the method proceeds to block 1030; otherwise, the method returns to block 1020. It will be appreciated that blocks 1020-1025 form an iterative loop.

At block 1030, if w=1 AND CumRowcount=n, then the method proceeds to block 1035; else the method proceeds to block 1040.

At block 1035, the n-th result is declared to be the last-read element.

At block 1040, w is reduced by a predetermined amount. Subsequently, the method returns to block 1010.

While method 1000 of FIG. 10 has been described hereinabove for a configuration with one lowest-layer IMN, it will be appreciated that the techniques may readily be applied to configurations having multiple lowest-layer IMN's. Such alternative exemplary embodiments are contemplated to be within the scope of the present disclosure.

Figures 11, 12:
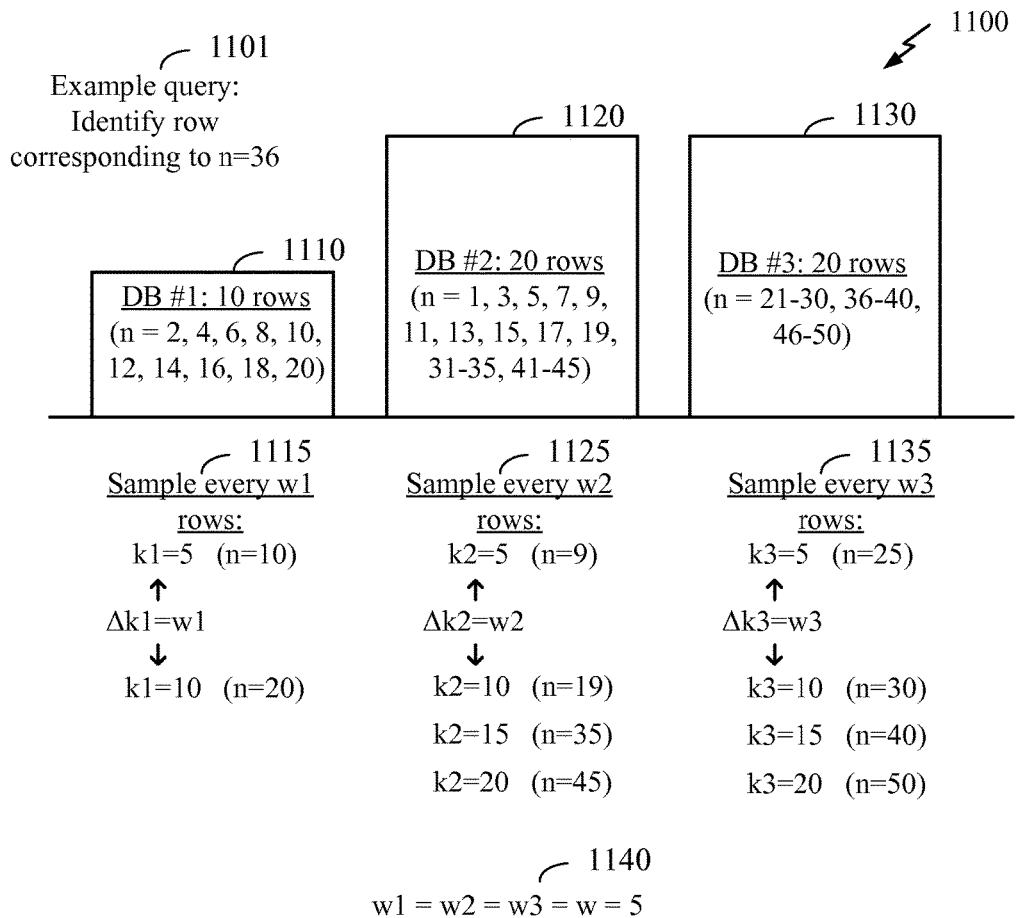
FIGS. 11-12 show an illustrative data distribution and computational table, respectively, wherein techniques described hereinabove with reference to FIG. 10 are applied.

FIGS. 11-12 show an illustrative data distribution 1100 and computational table 1200, respectively, wherein techniques described hereinabove with reference to FIG. 10 for determining an n-th sorted data record or row are applied. Note the example in FIGS. 11-12 is given for descriptive purposes only, and is not meant to limit the techniques to any particular numbers, window sizes, number of component databases, etc., shown.

In FIG. 11, an example query 1101 seeks to locate the data record (also denoted herein as "row") corresponding to n=36 from amongst three component DB's 1110, 1120, 1130, collectively storing a total of fifty rows. Note n, also denoted herein as n-value, may generally be an index to a specific row in the collection of all rows over all component databases, sorted according to the attribute or column specified in query 1101. For example, n=1 refers to the first (topmost) sorted row fulfilling the query conditions.

In FIG. 11, DB #1 1110 includes ten (10) rows, while DB #2 1120 and DB #3 1130 each include twenty (20) rows. Note for descriptive purposes, the actual (post-sorted) n-values the rows stored in each database are also explicitly indicated (e.g., DB #1 stores rows n=2, 4, 6, 8, 10, 12, 14, 16, 18, 20). However, it will be appreciated that such actual n-values are generally not known a priori, and it may be an objective of block 910 in FIG. 9 to determine the identity of the row corresponding to the queried n-value (e.g., n=36) from amongst the plurality of component databases.

Proceeding with reference to the illustrative implementation 910.1 shown in FIG. 10 of block 910, at block 1005, the skip-read window size w is initialized to 5, as indicated at field 1140. Accordingly, Per-DB Uncertainties for each of DB #1, DB #2, DB #3 are initialized to 5 each.

Note in the example shown, w is illustratively set to the same number (5) for all three component databases (e.g., w=w1=w2=w3). However, it will be appreciated that w may generally be set independently for each component database (e.g., w1≠w2≠w3), as earlier described hereinabove with reference to block 1005.

At block 1010, every w-th (i.e., every fifth value in the example shown, with w=5) sorted row in each component database is sampled. In this Specification and in the Claims, the k-th sorted row for component database DB #i may be denoted ki, and may also be referred to as a "Per-DB Rowcount." For example, the $5^{th}$ sorted row for DB #1 (also corresponding to the first sampled row for DB #1 with w1=5) is denoted k1=5.

For example, field 1115 illustratively shows that two rows having Per-DB Rowcounts k1=5 and k1=10 (corresponding to sorted values n=10 and n=20, respectively) are sampled from DB #1. Similarly, four rows are sampled from each of DB #2 and DB #3. Note the spacing (or delta) between the successive sampled Per-DB Rowcounts (ki) correspond to the chosen window size for that component DB, e.g., Δk1=w1 for DB #1 as indicated in field 1115, wherein Δk1 determines the difference between successive Rowcounts k1=5 and k1=10.

At block 1015, all sampled rows from all component DB's are sorted by the specified attribute in query 1101. The sorted sampled rows are shown in FIG. 12, with each sorted sampled row identified by a sequence number (Seq #) in column 1210.

Through multiple iterations of blocks 1020-1025, the counter variable CumRowcount is incremented by w (=5) each time a row is read from the sorted sampled rows. Furthermore, the Per-DB Uncertainties vector (column 1250 in FIG. 12) is updated.

For example, referring to FIG. 12, after reading a first sorted sampled row (Seq #1, n=9), CumRowcount is incremented to 5 (from the initial value 0). After reading the first row, the Per-DB Uncertainties vector (shown in column 1250) is updated to [4, 5, 5], indicating that the DB #1 Uncertainty is 4, i.e., there are four more rows until the next row to be read in DB #1. Accordingly, TotalUncertainty (shown in column 1260) is computed as 14, i.e., the sum of all entries in the Per-DB Uncertainties vector.

Following the check at block 1025, it is seen that after reading the first sorted sampled row, CumRowcount (=5) plus TotalUncertainty (=14) is not greater than or equal to n (=36) (i.e., 19<36). Thus method 910.1 returns to block 1020 for the next iteration.

Following subsequent iterations of blocks 1020-1025, it will be seen that, after reading a fourth sorted sampled data record (Seq #4, n=20), the DB #1 Uncertainty is 0, i.e., all rows from DB #1 have been read, and the associated Per-DB Uncertainty vector for Seq #4 is thus [0, 4, 5]. Note after reading the fourth sorted sampled row, it can be inferred that the desired record (corresponding to n=36) must not lie in DB #1, as it is known that DB #1 does not contain any records beyond n=20. In an exemplary embodiment, this knowledge may be utilized when subsequently formulating a modified query plan with smaller w, as further described hereinbelow.

Following additional iterations of blocks 1020-1025, it will be seen that, after reading a sixth sorted sampled data record (Seq #6, n=30) at block 1020, the CumRowcount is 30, while TotalUncertainty is 8. At this point, at block 1025, CumRowcount (30) plus TotalUncertainty (8) is determined to be greater than n (=36), i.e., 38>=36. Accordingly, method 910.1 exits the iterative loop of blocks 1020-1025, and proceeds to block 1030.

As noted hereinabove, after exiting the iterative loop of blocks 1020-1025, it can be inferred that the desired record n=36 does not lie in DB #1. Furthermore, the identity (and corresponding attribute value) of a row having an n-value within a range of n=36 is known. However, the precise identity of the row with n=36 cannot be inferred, since TotalUncertainty (=8 at Seq #6) exceeds the minimum level required to distinguish the $36^{th}$ record from, e.g., the $35^{th}$ or $37^{th}$ record.

Accordingly, at block 1040, w (or alternatively, Per-DB window sizes w1, w2, etc.) is reduced, and query 1101 reformulated as a modified query. For example, utilizing the information obtained with w=5 as shown in table 1200, the modified query may seek to locate only the top six sorted records having n greater than 30 (e.g., excluding any rows having queried attribute values falling within those of the first 30 rows), and with w reduced to w=1. In an exemplary embodiment, a modified query plan is further generated to exclude any non-relevant component DB's (e.g., DB #1 in the previous example) in the subsequent query.

It will be appreciated that, by sampling every w-th record of each component DB (as opposed to sampling every record), and subsequently submitting a modified query as described hereinabove, the total number of read/sort operations, as well as memory requirements, required to identify an n-th row in the database may be substantially reduced. Note these techniques may be particularly advantageous when sorting large datasets, e.g., when n and/or the total number rows number in the millions or more.

Figure 13:
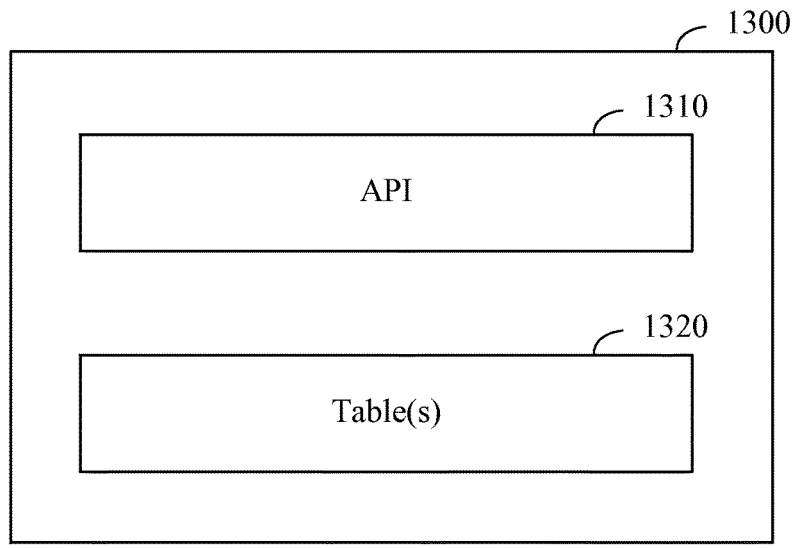
FIG. 13 illustrates an exemplary embodiment of a central server apparatus according to the present disclosure.

FIG. 13 illustrates an exemplary embodiment 1300 of a central server apparatus according to the present disclosure. Note FIG. 13 is shown for illustrative purposes only, and is not meant to limit the scope of the present disclosure to any particular apparatus shown.

In FIG. 13, central server apparatus 1300 comprises: an application interface (API) 1310 configured to receive and respond to a user query; and at least one table (1320) configured to generate a histogram output signal identifying at least one component database relevant to an ancestor-descendant relationship extracted from the user query. The central server apparatus is configured to submit a query to the at least one relevant component database according to a dynamically configured query plan, and to respond to the user query based on results generated by the at least one relevant component database.

Figure 14:
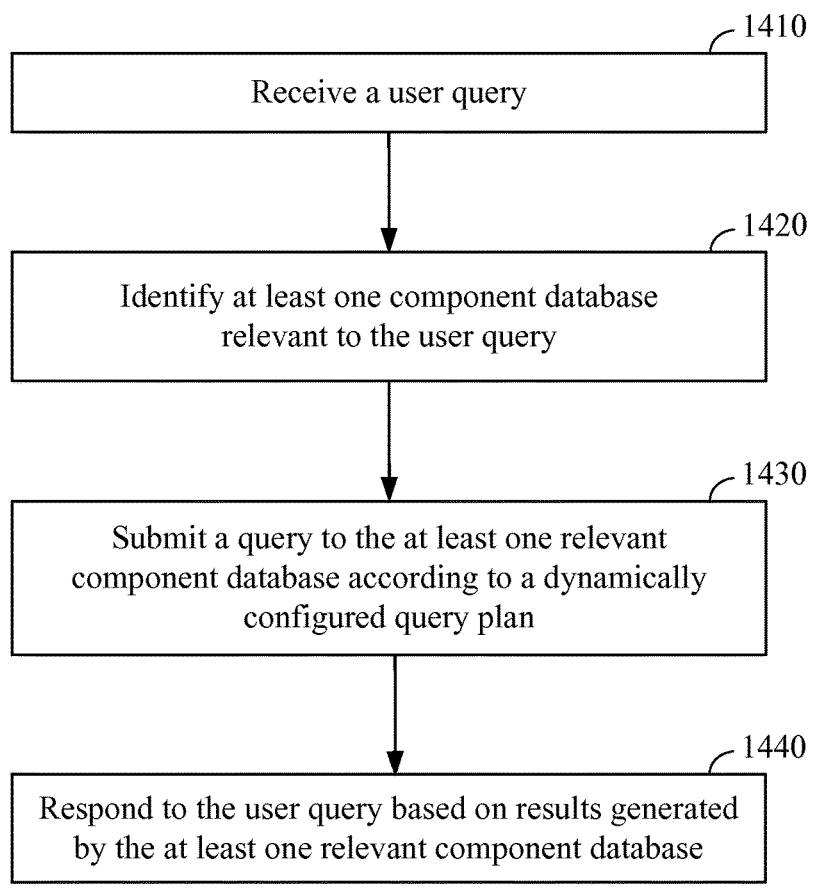
FIG. 14 illustrates an exemplary embodiment of a method according to the present disclosure.

FIG. 14 illustrates an exemplary embodiment 1400 of a method according to the present disclosure. Note FIG. 14 is shown for illustrative purposes only, and is not meant to limit the scope of the present disclosure to any particular method shown.

In FIG. 14, at block 1410, a user query is received through an API.

At block 1420, at least one component database relevant to the user query is identified by querying at least one table coupled to a central server. The at least one relevant component database corresponds to an ancestor-descendant relationship extracted from the user query. In an exemplary embodiment, providing at least one relevant component database in this manner advantageously reduces memory and computing resource requirements. In particular, if data to be queried were to be indexed in a conventional database, in the worst case, it would require an index for every possible set of property/column combinations. The addition of indexes for every such combination may be prohibitively expensive in terms of the time required to commit index updates and the database storage required.

At block 1430, a query for data is submitted to the at least one relevant component database according to a dynamically configured query plan. In an exemplary embodiment, the dynamically configured query plan advantageously reduces network bandwidth and loading requirements. In particular, the dynamically configured query plan may allocate intermediary nodes to specific databases based on load balancing, bandwidth optimization, IMN-component database affinity, connection pooling, number of issued concurrent queries to a given IMN or component database, etc.

At block 1440, a response is generated to the user query through the API based on results generated by the at least one relevant component database.

Figure 15:
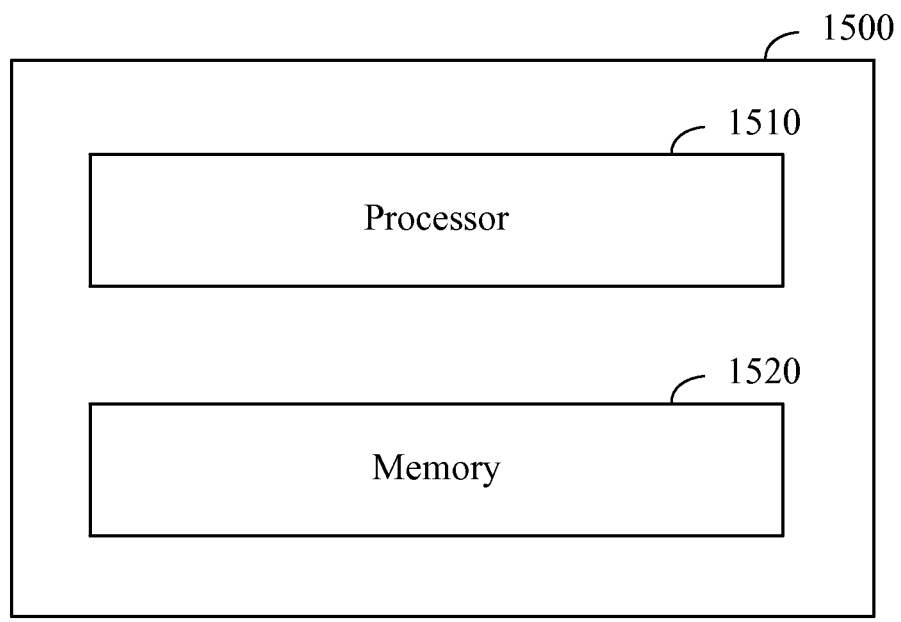
FIG. 15 illustrates an exemplary embodiment of a computing device according to the present disclosure.

FIG. 15 illustrates an exemplary embodiment 1500 of a computing device according to the present disclosure. Note FIG. 15 is shown for illustrative purposes only, and is not meant to limit the scope of the present disclosure to any particular computing device shown.

In FIG. 15, device 1500 includes a processor 1510 and a memory 1520 holding instructions executable by the processor to: receive a user query; identify at least one component database relevant to the user query by querying at least one table coupled to a central server, the at least one relevant component database corresponding to an ancestor-descendant relationship extracted from the user query; submit a query to the at least one relevant component database according to a dynamically configured query plan; and respond to the user query based on results generated by the at least one relevant component database.

Figure 16:
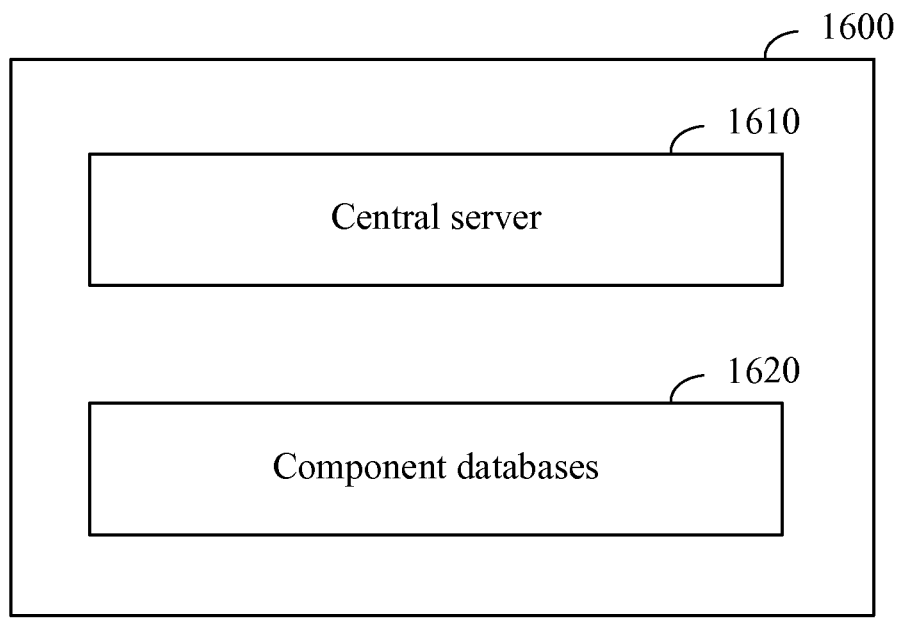
FIG. 16 illustrates an exemplary embodiment of a system according to the present disclosure.

FIG. 16 illustrates an exemplary embodiment 1600 of a system according to the present disclosure. Note FIG. 16 is shown for illustrative purposes only, and is not meant to limit the scope of the present disclosure to any particular system shown.

In FIG. 16, system 1600 includes a central server 1610 configured to receive and respond to a user query; and a plurality of component databases 1620. The central server 1610 is configured to: access at least one table generating a histogram output signal identifying at least one of the plurality of component databases relevant to an ancestor-descendant relationship extracted from the user query by the central server; and submit a query to the at least one relevant component database according to a dynamically configured query plan.

In an aspect of the present disclosure, a central server apparatus comprises: an application interface (API) configured to receive and respond to a user query; and at least one table configured to generate a histogram output signal identifying at least one component database relevant to an ancestor-descendant relationship extracted from the user query; wherein the central server apparatus is configured to submit a query to the at least one relevant component database according to a dynamically configured query plan, and to respond to the user query based on results generated by the at least one relevant component database.

In another aspect of the present disclosure, a method comprises: receiving a user query through an API; identifying at least one component database relevant to the user query by querying at least one table coupled to a central server, the at least one relevant component database corresponding to an ancestor-descendant relationship extracted from the user query; submitting a query for data to the at least one relevant component database according to a dynamically configured query plan; and responding to the user query through the API based on results generated by the at least one relevant component database.

In yet another aspect of the present disclosure, a system comprises: a central server configured to receive and respond to a user query; and a plurality of component databases; wherein the central server is configured to: access at least one table generating a histogram output signal identifying at least one of the plurality of component databases relevant to an ancestor-descendant relationship extracted from the user query by the central server; and submit a query to the at least one relevant component database according to a dynamically configured query plan.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A central server apparatus comprising:
a processor;
an application programming interface (API) module to receive and respond to a user query; and
at least one table to generate a histogram output signal identifying a plurality of component databases relevant to an ancestor-descendant relationship extracted from the user query;
wherein the central server apparatus is to submit a query to the plurality of component databases via a plurality of intermediary nodes selected according to a dynamically configured query plan, and to respond to the user query based on results generated by the plurality of component databases and received via the plurality of intermediary nodes: and
wherein each of the plurality of intermediary nodes comprises a cloud computing server;
the query plan specifying the plurality of intermediary nodes such that each intermediary node is directly coupled to no more than a predetermined maximum number of component databases; and
dynamically configuring the query plan to select the plurality of intermediate nodes as a function of load balancing and bandwidth optimization.

2. The apparatus of claim 1, each intermediary node further performing functions comprising sorting, filtering, and paginating results returned from the plurality of component databases prior to returning results to the central server.

3. The apparatus of claim 1, the query plan further specifying a plurality of Layer II intermediary nodes coupled to the plurality of intermediary nodes, each of the plurality of Layer II intermediary nodes being directly coupled to a subset of the plurality of component databases.

4. The apparatus of claim 1, the at least one table comprising: a root database identifying a root partition index corresponding to a root object derived from the user query; and a relationship histogram table generating the histogram output signal based on the root partition index and the extracted ancestor-descendant relationship.

5. The apparatus of claim 1, the at least one table comprising a single look-up table generating the histogram output signal based on a root object derived from the user query and the extracted ancestor-descendant relationship.

6. A method comprising:
receiving a user query through an application programming interface (API);
identifying a plurality of component databases relevant to the user query by querying at least one table coupled to a central server, the plurality of component databases storing data corresponding to an ancestor-descendant relationship extracted from the user query;
submitting a query for data to the plurality of component databases via a plurality of intermediary nodes selected according to a dynamically configured query plan; and
responding to the user query through the API based on results generated by the at least one relevant component database and received via the plurality of intermediary nodes;
wherein each of the plurality of intermediary nodes comprises a cloud computing server;
the query plan specifying the plurality of intermediary nodes such that each intermediary node is directly coupled to no more than a predetermined maximum number of component databases; and
dynamically configuring the query plan to select the plurality of intermediate nodes as a function of load balancing and bandwidth optimization.

7. The method of claim 6, further comprising:
at each intermediary node, sorting, filtering, and paginating results returned from the plurality of component databases prior to returning results to the central server.

8. The method of claim 6, the query plan further specifying a plurality of Layer II intermediary nodes coupled to the plurality of intermediary nodes, each of the plurality of Layer II intermediary nodes being directly coupled to a subset of the plurality of component databases.

9. The method of claim 6, further comprising locating and returning a sorted result of sequence number n to the central server by:
sampling an element while skipping w−1 elements from each of the plurality of component databases, wherein w comprises a skip-read window size;
sorting and reading the sampled elements until all of the plurality of component databases have been processed, or until an uncertainty window exceeds the value of n; and
re-submitting a modified query excluding the sort and read sampled elements and further reducing the value of w to locate the sorted result of sequence number n.

10. A system comprising:
a processor;
a central server to receive and respond to a user query; and
a plurality of component databases;
wherein the central server is to:
access at least one table generating a histogram output signal identifying at least one of the plurality of component databases relevant to an ancestor-descendant relationship extracted from the user query by the central server; and
submit a query to the plurality of component databases via a plurality of intermediary nodes selected according to a dynamically configured query plan;
wherein each of the plurality of intermediary nodes comprises a cloud computing server;
the query plan specifying the plurality of intermediary nodes such that each intermediary node is directly coupled to no more than a predetermined maximum number of component databases; and
dynamically configuring the query plan to select the plurality of intermediate nodes as a function of load balancing and bandwidth optimization.

11. The system of claim 10, each intermediary node further performing functions comprising sorting, filtering, and paginating results returned from the plurality of component databases prior to returning results to the central server.

12. The system of claim 11, each intermediary node configured to paginate results returned from the plurality of component databases by: running a probe query to determine an n-th sorted element per the user query; and retrieve results from the plurality of component databases using a modified query excluding the first n results returned.

* * * * *